United States Patent
Crocker et al.

(10) Patent No.: US 9,766,773 B2
(45) Date of Patent: Sep. 19, 2017

(54) DYNAMIC PLAYER ACTIVITY ENVIRONMENT RESPONSE

(71) Applicant: Disney Enterprises, Inc., Burbank, CA (US)

(72) Inventors: John Crocker, Burbank, CA (US); Christopher Heatherly, Monrovia, CA (US); Steve Makofsky, Sammamish, WA (US)

(73) Assignee: Disney Enterprises, Inc., Burbank, CA (US)

( * ) Notice: Subject to any disclaimer, the term of this patent is extended or adjusted under 35 U.S.C. 154(b) by 278 days.

(21) Appl. No.: 13/956,089

(22) Filed: Jul. 31, 2013

(65) Prior Publication Data

US 2015/0040036 A1    Feb. 5, 2015

(51) Int. Cl.
*G06F 3/0481*    (2013.01)
*H04L 12/18*    (2006.01)
*H04L 12/58*    (2006.01)
*A63F 13/30*    (2014.01)

(52) U.S. Cl.
CPC .......... *G06F 3/04815* (2013.01); *A63F 13/30* (2014.09); *H04L 12/1827* (2013.01); *H04L 51/02* (2013.01); *A63F 2300/535* (2013.01); *A63F 2300/5553* (2013.01); *A63F 2300/5566* (2013.01); *A63F 2300/60* (2013.01)

(58) Field of Classification Search
CPC ..... A63F 2300/5553; A63F 2300/5566; G06F 3/04815; G06F 3/011
USPC .......................................... 715/757, 863, 850
See application file for complete search history.

(56) References Cited

U.S. PATENT DOCUMENTS

| | | | |
|---|---|---|---|
| 7,840,903 B1 * | 11/2010 | Amidon | G06F 3/04815 715/733 |
| 8,458,352 B2 * | 6/2013 | Hamilton et al. | 709/231 |
| 2009/0100351 A1 * | 4/2009 | Bromenshenkel et al. | 715/757 |
| 2009/0300493 A1 * | 12/2009 | Hamilton et al. | 715/706 |
| 2010/0081508 A1 * | 4/2010 | Bhogal | A63F 13/12 463/40 |
| 2010/0199047 A1 * | 8/2010 | Corrao | G06F 12/122 711/141 |
| 2011/0010325 A1 * | 1/2011 | Brillhart | G06N 3/006 706/47 |
| 2013/0031475 A1 * | 1/2013 | Maor et al. | 715/706 |

* cited by examiner

*Primary Examiner* — Christopher J Fibbi
(74) *Attorney, Agent, or Firm* — Patterson + Sheridan, LLP (57) ABSTRACT

Systems, methods, and computer program products to provide responses to emergent group activities in an interactive environment, by monitoring actions of one or more avatars in the interactive environment, the one or more avatars being controlled by a respective user, detecting a first action matching a first action property in a first group activity template for a first group activity, of a plurality of group activity templates, determining that the first group activity is occurring in the interactive environment, and issuing to one or more components of the interactive environment, an indication to perform a respective predefined operation.

24 Claims, 7 Drawing Sheets

DYNAMIC PLAYER ACTIVITY ENVIRONMENT RESPONSE

BACKGROUND

Field of the Disclosure

Embodiments disclosed herein relate to the field of computer software. More specifically, embodiments disclosed herein relate to computer software which provides an interactive environment that responds to emergent group activities.

Description of the Related Art

A virtual world is a simulated interactive environment in which users may interact with virtual objects and locations of the virtual world. Each user may control a respective avatar through which the user may interact with other users' avatars in the virtual world. An avatar generally provides a graphical representation of an individual within the virtual world environment. Avatars are usually presented to other users as two or three-dimensional graphical representations that resembles a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like.

Some virtual worlds are described as being persistent. A persistent world provides an immersive environment (e.g., a fantasy setting used as a setting for a role-playing game, or a virtual world complete with land, buildings, towns, and economies) that is generally always available and where events continue to occur regardless of the presence of a given avatar. Thus, unlike more conventional online games or multi-user environments, the virtual world continues to exist and plots and events continue to unfold as users enter (and exit) the virtual world. Virtual environments are presented as images on a display screen and some virtual environment may allow users to record events that occur within the virtual environment.

In interactive environments and massively multiplayer online (MMO) games, players like to engage in emergent, group based open form role playing activities, such as a flash mob. These activities may be very impromptu, and may take place in different locations at random times. Some are coordinated in-world by the players using their friends list to set a time and place. This open style of game play provides a very rich layer of activities in virtual worlds in addition to helping developers reduce the amount of content they need to create in order to keep the virtual world engaging. However, since these activities are player initiated, the environments they take place in do not respond to these activities, and therefore cannot do anything to support or encourage these types of activities.

SUMMARY

Embodiments disclosed herein provide a system, method, and computer program product to provide responses to emergent group activities in an interactive environment, by monitoring actions of one or more avatars in the interactive environment, the one or more avatars being controlled by a respective user, detecting a first action matching a first action property in a first group activity template for a first group activity, of a plurality of group activity templates, and responsive to determining that the first group activity is occurring in the interactive environment, issuing to one or more components of the interactive environment, an indication to perform a respective predefined operation.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments disclosed herein interpret and aggregate actions and events in an interactive environment and classify them as group activities that can be communicated to other systems and players in the interactive environment. In response, the other systems may notify the players, add effects, and provide relevant objects for the players to use during the group activities. The player actions may be any action traceable in the interactive environment, which include, but is not limited to, players in a virtual world putting items on an avatar, taking items off an avatar, selecting specific chat phrases, clicking on an action (like an emote), a player taking an action (such as throwing a snowball), or any combination of actions. For example, if a virtual world application (providing one type of interactive environment) determines that a Mardi Gras parade is occurring in a replica of New Orleans, the virtual world application may notify all users in the virtual world, as well as provide hats, masks, beads, and gloves for the users to put on their avatars. Additionally, the virtual world application may provide other items and effects, such as setting off fireworks. The virtual world application may determine that the parade is occurring based on the actions of one or more avatars.

As used herein, an "interactive environment" can be any immersive environment, including but not limited to a virtual world providing a computer-generated environment, a game, or an augmented reality environment in which computer generated effects are used to enhance images or video of the real world. Different types of interactive environments may provide different levels of immersion into the interactive environments. For example, the user may don a set of virtual reality goggles that have a screen display for each lens. Further, the goggles could be equipped with motion sensors that cause the view of the interactive environment presented to the user to move based on the head movements of the individual. As another example, the user could don a pair of gloves configured to translate motion and movement of the user's hands into avatar movements within the interactive environment. Of course, embodiments of the disclosure are not limited to these examples as, the disclosure may be adapted for use with a variety of devices configured to present the interactive environment to the user and to translate movement/motion or other actions of the user into actions performed by the avatar representing that user within interactive environment. The methods and techniques described herein may be equally applied to any type of interactive environment, and the use of a virtual world as a reference example should not be considered limiting of the disclosure.

As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. This augmented view of the real world may be referred to herein as an "augmented reality world" or an "augmented reality space."

Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located. Continuing the above example, as the user points the camera of the augmented reality device at the physical coffee cup on the table from different angles, the user may instead see different angles of the virtual cartoon coffee cup displayed on the augmented reality device.

Figure 1:
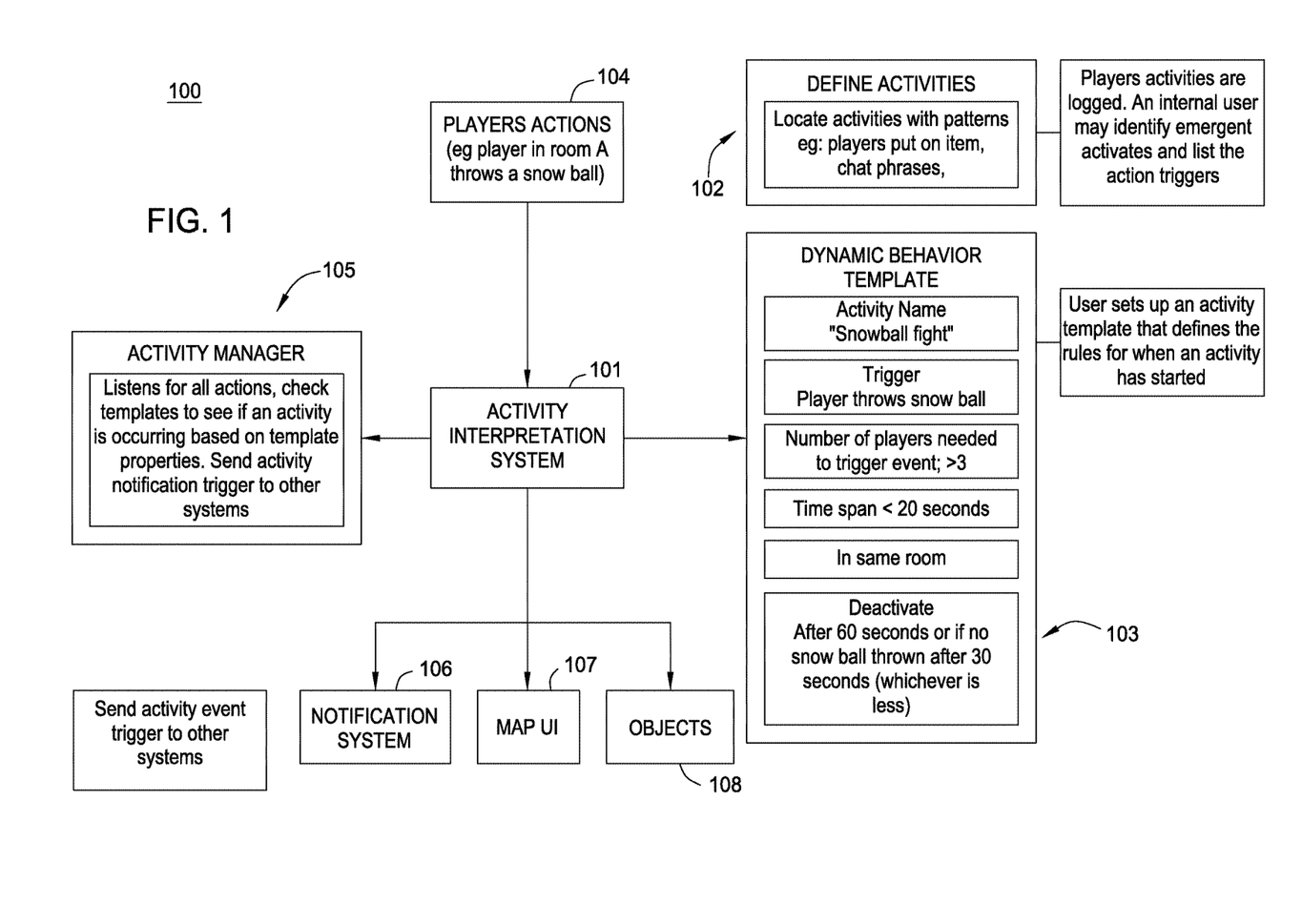
FIG. 1 illustrates techniques for dynamic player activity environment responses, according to one embodiment.

FIG. 1 is a schematic 100 illustrating techniques for dynamic player activity environment responses, according to one embodiment. An activity interpretation system 101 orchestrates communications between its different components. At block 102, group activities are defined. An "internal user," i.e., a system administrator playing the game, may monitor players in the virtual world to detect emergent group activities with patterns. Alternatively, the activity interpretation system 101, or another designated component of the virtual world, may use machine learning to detect new emergent group activities. When an emergent group activity, such as a flash mob, is identified, a dynamic behavior template may be created for the activity.

As shown, a dynamic behavior template 103 has been defined for a "snowball fight." The dynamic behavior template 103 includes a plurality of attributes, or triggers, that define the emergent group activity. For example, a first trigger in the dynamic behavior template 103 specifies a player throwing a snow ball. In one embodiment, this may be an initial trigger that causes the activity interpretation system 101 to start a timer having a predefined time threshold, which in which some or all of the remaining triggers must be detected to consider the group activity as occurring. For example, other attributes of the snowball fight specify that more than 3 players are needed in the same room throwing snowballs within 20 seconds of each other. If at least one of these additional attributes is not detected, the activity interpretation system 101 may determine that the snowball fight is not occurring. If, however, a threshold number of triggers are observed, the activity interpretation system 101 may determine that the group activity is indeed occurring. In response, the activity interpretation system 101 may send activity event triggers to other systems in the virtual world, such as a notification system 106, a map user interface (UI) 107, and objects system 108. In another embodiment, the virtual world activity may send a notification to other users upon detecting a single avatar performing one or more attributes of the group activity. For example, if a single avatar throws a snowball, the activity interpretation system 101 may cause the notification system 106 to notify other avatars that the avatar is throwing a snowball, and that they may wish to join him.

The activity interpretation system 101 includes an activity manager 105 which is configured to listen for all actions in the virtual world and reference one or more behavior templates to determine if the activity is occurring based on the template properties. If the activity manager 105 determines that the group activity is occurring, it may send the notification trigger to the other systems 106-108. The notification system 106 is generally configured to alert users that the group activity is occurring. The notifications may take any form, such as in-game popup messages, private messages, emails, and the like. The notification system 106 may notify all users of the virtual world, or select targeted individuals based on user profile data that indicates the users may be interested in the current group activity. The map UI 107 is generally configured to provide a map of the virtual world. When receiving an indication from the activity manager 105, the map UI 107 may mark a location on the map of the virtual world specifying where the emergent group activity is occurring. The objects system 108 is generally configured to provide relevant effects and objects during the group activity. For example, the objects system 108 may add a kiosk to the virtual world to sell special, exclusive items that can only be purchased when the activity is active, providing an incentive for users to engage in the group activity, and enhancing the game play. Additionally, the objects system 108 may add other effects, enhancements, and objects to the activity, such as costumes, accessories, and equipment. Generally, any type of response may be provided by the objects system 108. The activity interpretation system 101 may deactivate the activity when it is completed. The deactivation rules may be defined in the template. As shown, the snowball fight is deactivated after 60 seconds, or if no snowballs are thrown after 30 seconds, whichever is less.

Figures 2A, 2B:
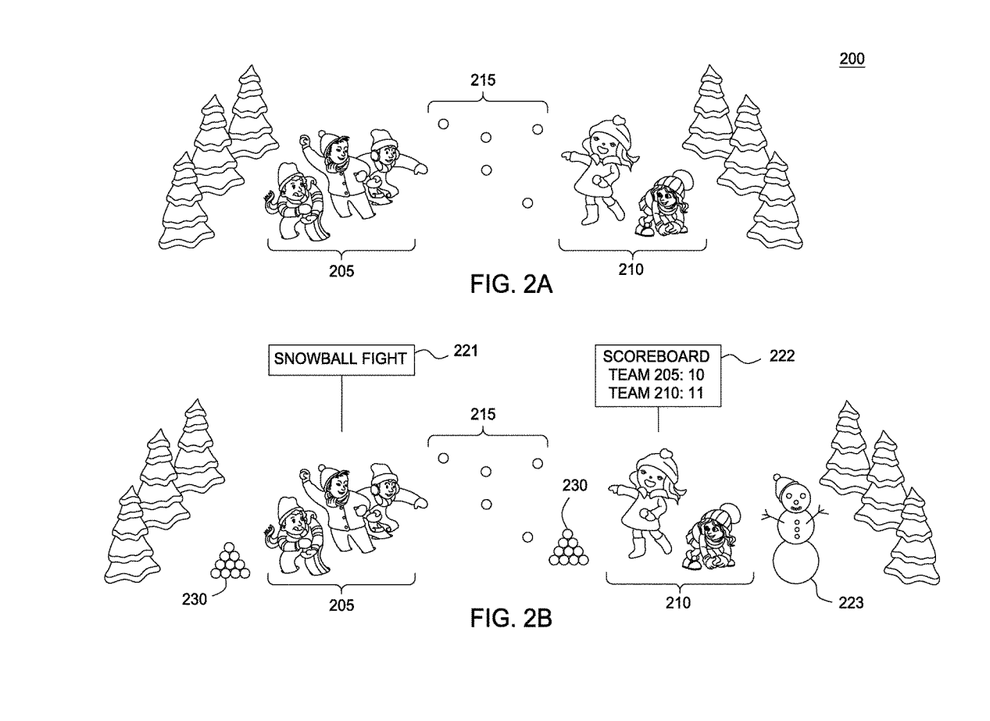
FIGS. 2A-2B illustrate dynamic player activity environment responses, according to one embodiment.

FIG. 2A is a schematic 200 for dynamic player activity environment responses, according to one embodiment. Generally, the schematic 200 depicts the formation of a virtual world snowball fight between a first team of avatars 205 and a second team of avatars 210. As shown, the avatars 205, 210, have begun throwing a number of snowballs 215 at each other. However, the environment surrounding the players has not been modified or enhanced in to facilitate the players' enjoyment of the snowball fight.

FIG. 2B is a schematic 200 for dynamic player activity environment responses, according to one embodiment. The schematic 200 shows enhancements to the snowball fight of FIG. 2A made by the activity interpretation system 101 responsive to detecting the snowball fight between the players. As shown, the activity interpretation system has added a billboard 221 which reads" Snowball Fight!" and a scoreboard 222 that keeps a tally of the "score" between the two sides in the snowball fight. Additionally, a giant snowman 223 has been added to the environment, as well as piles of large snowballs 230 that the avatars can use to throw at each other. Generally, any type of enhancement can be added by the activity interpretation system 101. For example, targets may be provided that, when hit, trigger an avalanche. Additionally, the snowman 223 may begin throwing its own snowballs at the avatars. Further still, background music may be played during the snowball fight. The activity interpretation system 101 may also send notifications to other users that the snowball fight is occurring, or modify a map of the virtual world to pinpoint the location that the snowball fight is occurring.

Figure 3:
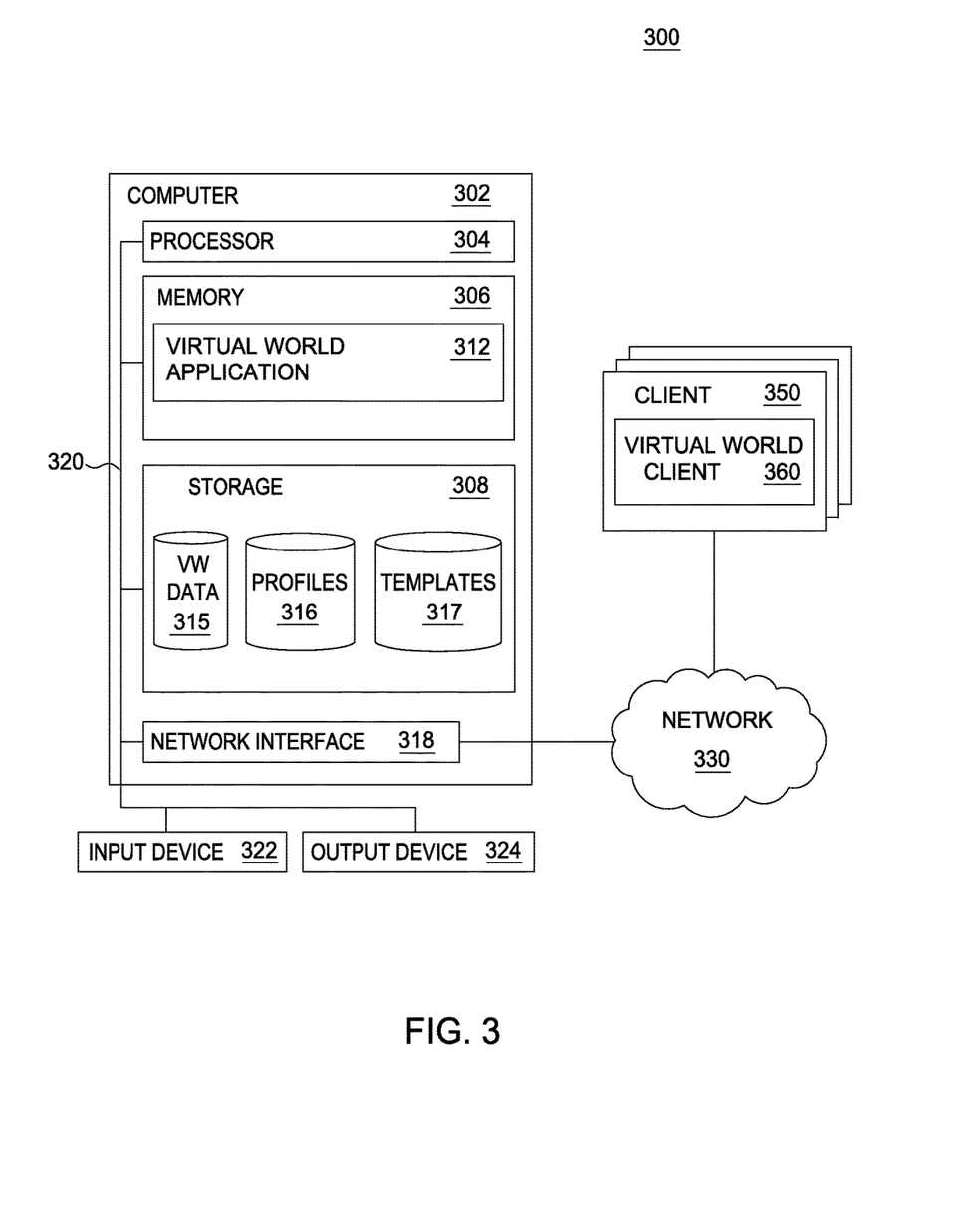
FIG. 3 illustrates a system for dynamic player activity environment responses, according to one embodiment.

FIG. 3 illustrates a system 300 for dynamic player activity environment responses, according to one embodiment. The networked system 300 includes a computer 302. The computer 302 may also be connected to other computers and client computers 350 via a network 330. In general, the network 330 may be a telecommunications network and/or a wide area network (WAN). In a particular embodiment, the network 330 is the Internet.

In one embodiment, the system 300 may include existing computer systems, e.g., desktop computers, server computers, laptop computers, tablet computers, and the like. The system 300 illustrated in FIG. 3, however, is merely an example of one computing environment. Embodiments of the present disclosure may be implemented differently, regardless of whether the computer systems are complex multi-user computing systems, such as a cluster of individual computers connected by a high-speed network, single-user workstations, or network appliances lacking non-volatile storage. Further, while FIG. 3 illustrates a client-server model, other models are contemplated such as a peer-to-peer model.

In one embodiment, each client 350 is a dedicated gaming console, such as a Sony PS3®, Nintendo Wii®, or Xbox 360®, capable of executing the virtual world client 360. In another embodiment, each client is a general purpose computer configured to run any variety of gaming and non-gaming software. The game may be viewed on a display device (not shown), such as an LCD, LED or CRT monitor display, and controlled using input devices (not shown) which may be, e.g., a keyboard, mouse and/or a controller The computer 302 generally includes a processor 304 connected via a bus 320 to a memory 306, a network interface device 318, a storage 308, an input device 322, and an output device 324. The computer 302 is generally under the control of an operating system (not shown). Examples of operating systems include the UNIX operating system, versions of the Microsoft Windows operating system, and distributions of the Linux operating system. More generally, any operating system supporting the functions disclosed herein may be used. The processor 304 is included to be representative of a single CPU, multiple CPUs, a single CPU having multiple processing cores, and the like. The network interface device 318 may be any type of network communications device allowing the computer 302 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The input device 322 may be any device for providing input to the computer 302. For example, a keyboard and/or a mouse may be used. The output device 324 may be any device for providing output to a user of the computer 302. For example, the output device 324 may be any conventional display screen or set of speakers. Although shown separately from the input device 322, the output device 324 and input device 322 may be combined. For example, a display screen with an integrated touch-screen may be used.

As shown, the memory 306 contains the virtual world application 312, which is an application generally configured to provide an interactive online experience through which a plurality of users can communicate in a virtual environment. The virtual world application 312 may be a video game, a virtual reality program, or any other application where users may be represented by avatars and navigate a virtual environment. The virtual world application 312 is further configured to monitor activities of avatars in the virtual world in order to detect emergent group activities between avatars. In response, the virtual world application 312 is configured to issue notifications to users that the group activities are occurring, modify maps of the virtual world to indicate the location of the group activity, and enhance the group activities by adding objects and other enhancements tailored to the specific activity while the activity is occurring.

As shown, storage 308 contains virtual world (vw) data, which stores information related to producing the virtual world, such as maps, layouts, avatars, equipment, effects, and the like. The profiles 316 contains user profiles for users of the virtual world, which may specify preferences, friendships, and other data about the users. The templates 317 stores a plurality of behavior templates that define different group activities, their triggers, properties, and other associated information. Each behavior template in the templates 317 may require a threshold number of triggers or conditions to be met within a predefined amount of time before the group activity is considered to be active. In another embodiment, each behavior template specifies a predefined score threshold that must be exceeded within the predefined amount of time in order for the virtual world application 312 to determine that the group activity is occurring. Each individual activity or property in a behavior template may have an associated weight that the virtual world application 312 uses to compute the score when detecting each activity or property. The templates 317 may store references to specific components of the virtual world application 312, as well as references to services the components may query to handle notifications. As shown, plurality of client computers $350_{1-N}$ access the virtual world application 312 through a virtual world client 360.

Figure 4:
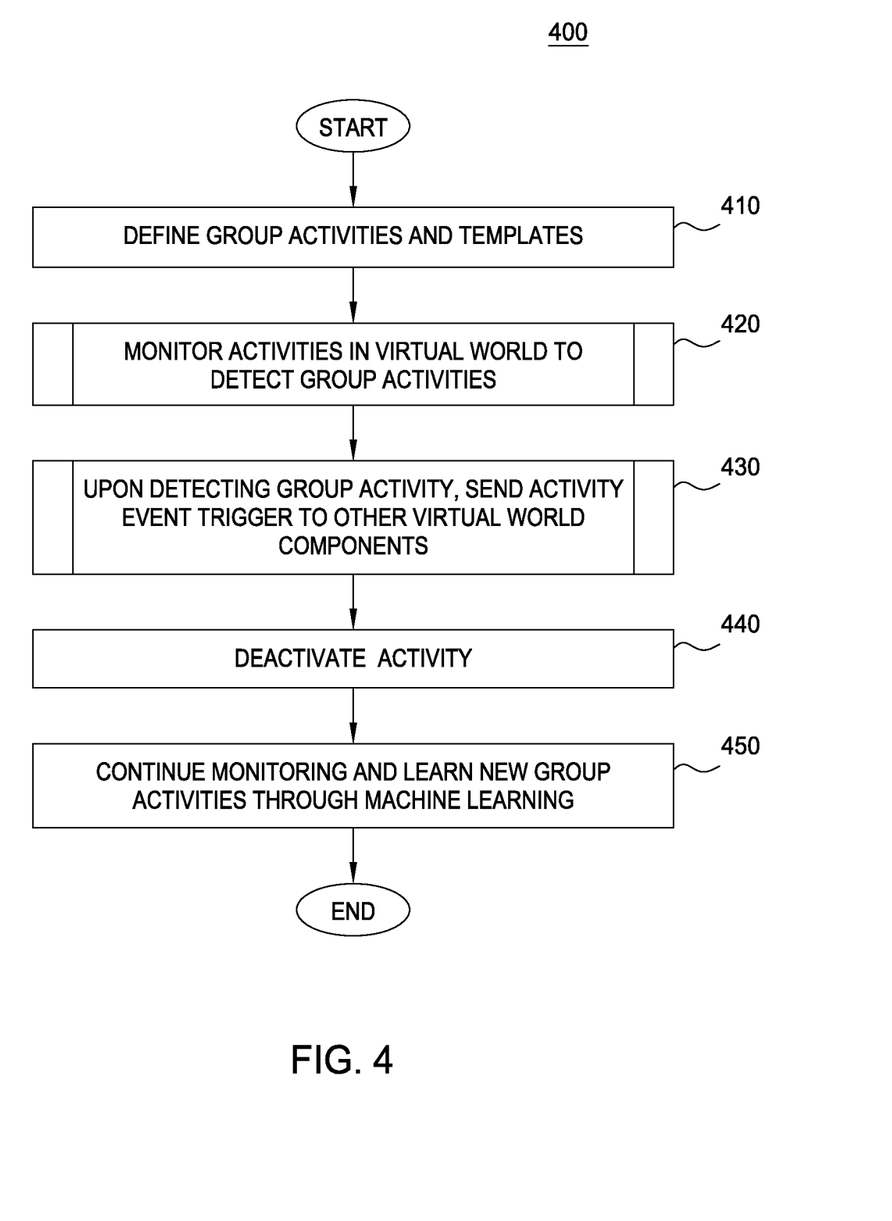
FIG. 4 illustrates a method for dynamic player activity environment responses, according to one embodiment.

FIG. 4 illustrates a method 400 for dynamic player activity environment responses, according to one embodiment. Generally, the steps of the method 400 provide enhanced virtual world environments that are responsive to emergent group activities. In one embodiment, the virtual world application 312, or designated components thereof, performs the steps of the method 400. At step 410, the virtual world application 312, or a user, defines group activities and the corresponding behavior templates for the activity. An internal user may detect different group activities while immersed in the virtual world, define an activity, and store its behavior template in the templates 317. For example, a flash mob behavior template may specify that at least 10 avatars must begin dancing in a public space within 10 seconds of each other, and dance for at least 10 seconds thereafter. A threshold number of activity elements or attributes may be specified for each behavior template, such that the virtual world application 312 is able to determine the point at which a group activity begins. For example, one, some, or all activity elements or attributes must be detected prior to the virtual world application 312 determining that a group activity is occurring in the virtual world. In some embodiments, each behavior template may specify a predefined score threshold that may be used to determine that the activity is occurring. The virtual world application 312 may score each detected activity matching an activity in the behavior template in order to determine whether the composite scores exceed the threshold.

At step 420, the virtual world application 312 may monitor activities in the virtual world to detect actions corresponding to group activities. In one embodiment, the virtual world application 312 contains a feed that specifies all activities taken by all users in the virtual world. A designated component of the virtual world application 312 may subscribe to this feed and look for actions set in the templates 317 to determine that an emergent group activity is occurring. The virtual world application 312 may determine that the group activity is occurring based on detecting a threshold number of activity elements, or based on a computed score for the monitored activities exceeding a score threshold. At step 430, a designated component of the virtual world application 312 sends activity event triggers to other components of the virtual world application 312 in response to detecting a group activity. For example, the activity triggers may cause a notification component to notify all users that the group activity is occurring, cause a map component to indicate where the group activity is occurring on a map of the virtual world, and may cause an objects component to add objects and other effects to enhance the group activity. At step 440, the virtual world application 312 deactivates the group activity and any associated additional effects, objects, and the like. At step 450, the virtual world application 312 continues monitoring for other group activities, and learns new group activities through machine learning. To implement machine learning, the virtual world application 312 may monitor defined activities and maintain a score based on each time the activity is triggered. The score may have a decay value based on time lapses between each trigger. The score will gain bonus points based on the total number of users participating in the event. If the score reaches a learning threshold, the virtual world application 312 may define a new group activity.

Figure 5:
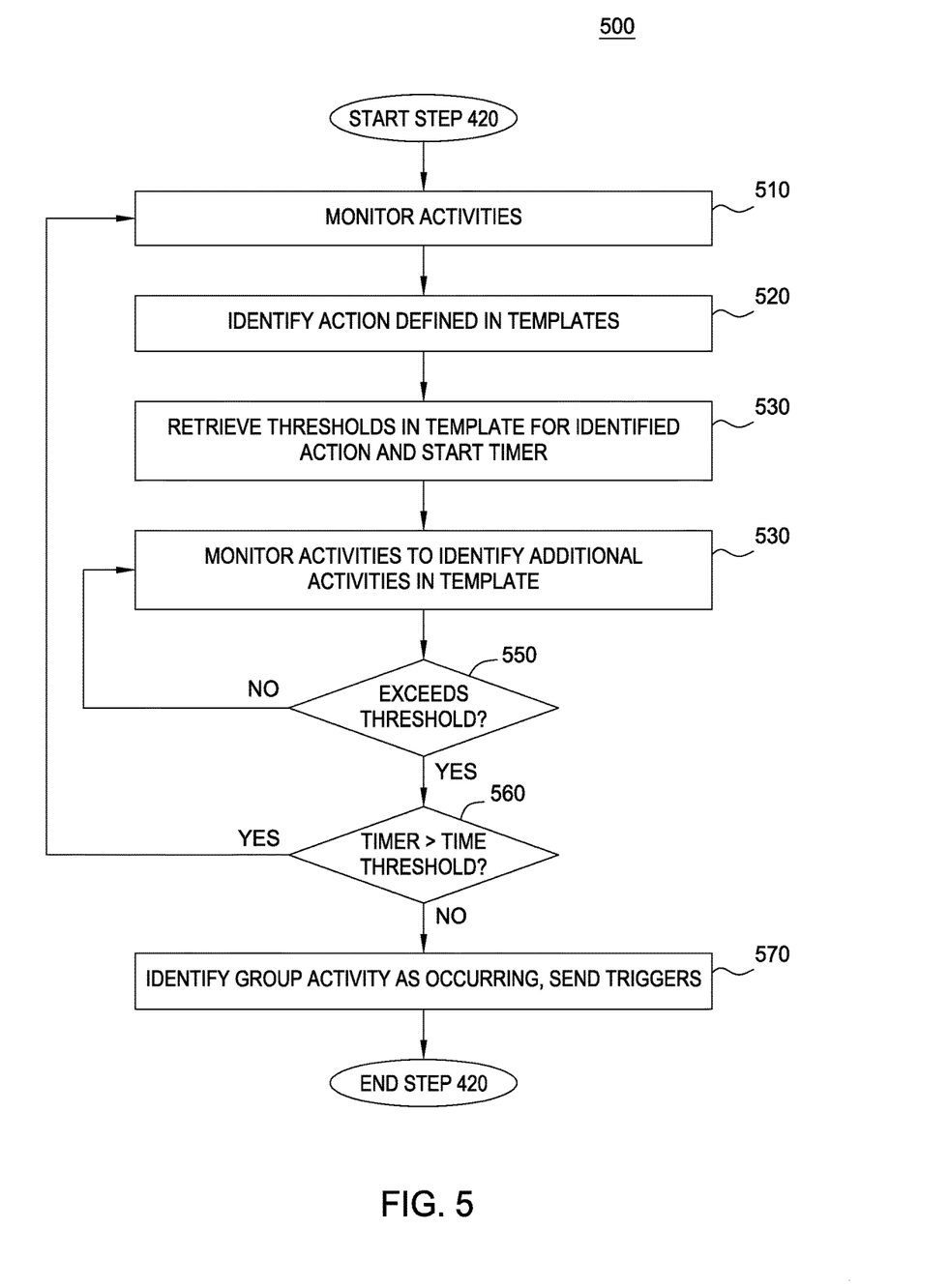
FIG. 5 illustrates a method to monitor activities in a virtual world to detect group activities, according to one embodiment.

FIG. 5 illustrates a method 500 corresponding to step 420 to monitor activities in a virtual world to detect group activities, according to one embodiment. Generally, the method 500 describes techniques for detecting emergent group activities in the virtual world by monitoring avatar activities to detect predefined attributes or triggers of one or more activity templates. In one embodiment, the virtual world application 312, or designated components thereof, performs the steps of the method 500.

At step 510, the virtual world application 312 monitors user activities. In one embodiment, the virtual world application 312 subscribes to an activity feed that specifies all actions taken by all users in the virtual world environment. The activity feed may specify, for example, that users are putting on cold weather clothing on their avatars, such as coats, hats, and gloves. At step 520, the virtual world application 312 identifies an action defined in the templates. For example, the act of putting on cold weather clothing may be defined as an activity in the snowball fight template. At step 530, the virtual world application 312 may retrieve a time and activity threshold in the template for the identified action, and start a timer. By starting the timer, the virtual world application 312 may determine whether the threshold number of template activities is completed within the time threshold in order to conclude that the activity is occurring.

At step 540, the virtual world application 312 continues to monitor activities to identify additional activities defined in the template for the group activity. If an additional activity is detected, the virtual world application 312 may increment an activity counter, and proceed to step 550. At step 550, the virtual world application 312 determines whether the activity counter exceeds the predefined activity threshold. If the activity threshold is not exceeded, the virtual world application 312 returns to step 550. If the activity threshold is exceeded, the threshold number of activities has been detected, and the virtual world application 312 proceeds to step 560.

At step 560, the virtual world application 312 determines whether the timer is greater than the time threshold. If yes, the activity threshold was not exceeded within the amount of time specified in the activity template, and the virtual world application 312 returns to step 510, where it continues to monitor activities. If the timer is not greater than the time threshold, the virtual world application 312 proceeds to step 570. At step 570, a designated component of the virtual world application 312 identifies the activity as occurring in the virtual world and issues triggers to other components the virtual world application 312.

In another embodiment, the virtual world application 312 may score each action defined in a behavior template that it identifies while monitoring activities. When a composite group activity score, made up of the score for each monitored action (which may be a single action), exceeds a predefined score threshold, the virtual world application 312 may determine that the group activity is occurring, so long as the score threshold is exceeded within the time threshold. For example, a rocket-pack group flying activity may have a behavior template specifying four action properties, namely that 10 or more avatars must equip themselves with rocket packs in the evening on the beach. The activity threshold in the template may specify that three of the four action properties must be detected. However, the virtual world application 312 may weight each of the four action properties differently for the purpose of computing a composite group activity score. For example, equipping one's avatar with a rocket pack may be weighted such that when the virtual world application 312 detects two or more avatars equipping themselves with rocket packs, the score threshold may be exceeded, and the virtual world application 312 may determine that the group flying activity is occurring. This score threshold may be exceeded even though the activity threshold requires three of the four actions in the activity template to occur. Generally, the score may be computed by any suitable scoring algorithm.

Figure 6:
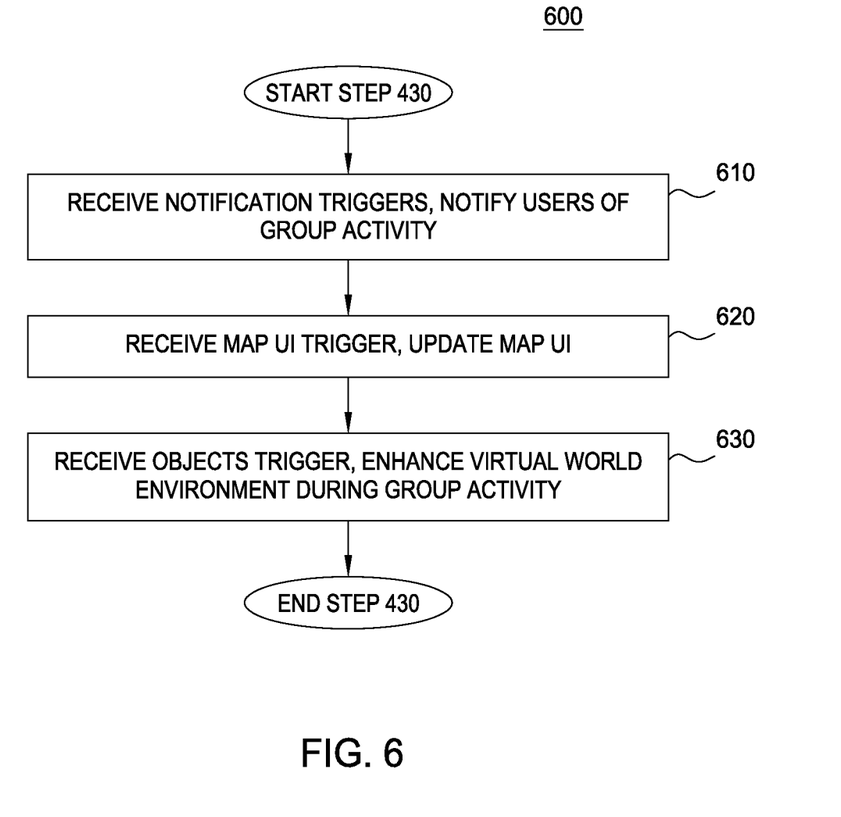
FIG. 6 illustrates a method for issuing activity event triggers in a virtual world, according to one embodiment.

FIG. 6 illustrates a method 600 corresponding to step 430 for issuing activity event triggers in a virtual world, according to one embodiment. Generally, the method 600 provides user notifications, map notifications, and additional objects and effects in the virtual world when an emergent group activity is detected. At step 610, a notification component of the virtual world application 312 may, responsive to receiving a notification trigger, notify users that the group activity is occurring. The notification may be a private message, email, popup notification, or any other type of notification. At step 620, a map UI component of the virtual world application 312 may update a map of the virtual world to indicate that the group activity is occurring responsive to receiving a map UI trigger. At step 630, an objects component of the virtual world application 312 may enhance the virtual world environment during the group activity responsive to receiving an objects trigger. For example, sports outfits and equipment may be provided to users playing a sport, while ice shields may be provided for users in snowball fights, and streamers may be provided that can be tossed by avatars during a parade. Generally, any type of enhancement may be provided.

Figure 7:
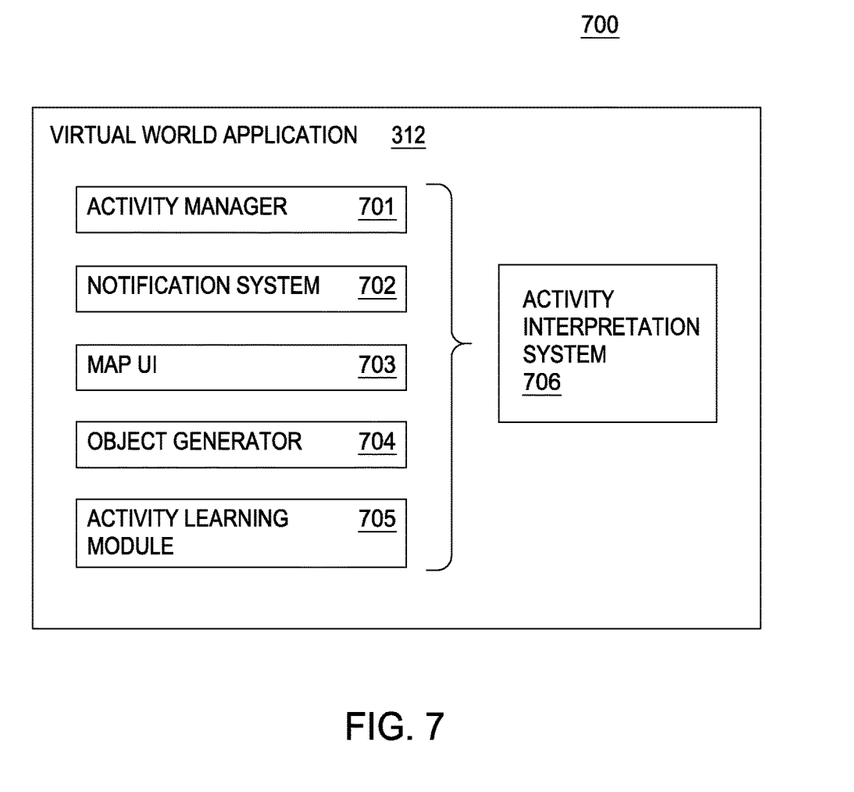
FIG. 7 illustrates components of a virtual world application configured to provide dynamic player activity environment responses, according to one embodiment.

FIG. 7 illustrates components of a virtual world application 312 configured to provide dynamic player activity environment responses, according to one embodiment. As shown, the virtual world application 312 includes an activity manager 701, which is an application generally configured to monitor user activities, look for actions matching activities defined in activity templates, and issue a notification to other components of the virtual world application 312 when it determines that a group activity is occurring. A notification system 702 is an application configured to notify one, several, or all users of the virtual world application 312 that the group activity is occurring. The notification system 702 may notify the users in any way, such as through emails, popup messages, and the like. The map UI 703 is an application generally configured to maintain a map of the virtual world environment, and place markers on the map indicating the location of group activities detected by the activity manager 701. An object generator 704 is an application configured to generate different effects and objects that can enhance the group activity. For example, if a group wrestling match is identified, the object generator may provide a scoreboard, a wrestling ring, and luchador-style wrestling costumes for the avatars. Generally, any object, effect, or enhancement may be provided by the object generator 704. The activity learning module 705 is an application configured to detect new emergent group activities by applying machine learning to observed user/avatar behaviors. Collectively, the activity manager 701, notification system 702, map UI 703, object generator 704, and activity learning module 705 form an activity interpretation system 706 of the virtual world application 312.

Advantageously, embodiments disclosed herein provide virtual world environments that are responsive to emergent group activities occurring within the virtual world. By defining, and later detecting the group activities, embodiments disclosed herein may, without requiring user input, notify users that the activities are occurring, indicate where they are occurring on a map of the virtual world, and enhance the user experience by adding different objects and effects during the activities.

In the foregoing, reference was made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications virtual world applications or related data available in the cloud. For example, the virtual world application could execute on a computing system in the cloud and provide an environment that is responsive to emergent group activities. In such a case, the virtual world application could use machine learning to identify new emergent group activities, and store corresponding activity templates at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to provide responses to emergent group activities in an interactive environment having a plurality of avatars, comprising:
    monitoring actions of one or more avatars in the interactive environment, the one or more avatars being controlled by a respective user;
    detecting a first action matching a first action property in a first group activity template for a first group activity, of a plurality of group activity templates, wherein the group activity templates define at least one action property for each respective group activity, wherein at least two avatars in the interactive environment participate in the first group activity;
    detecting a subsequent set of actions that match a respective action property specified in the first group activity template;
    computing a respective score for: (i) the first action, and (ii) each action in the subsequent set of actions, wherein each score reflects a respective likelihood that the first group activity is occurring;
    computing a composite score based on the respective scores computed for the first action and each action of the subsequent set of actions;
    determining that the first group activity is occurring based on the composite score exceeding a composite score threshold specified in the first group activity template; and
    responsive to determining that the first group activity is occurring, issuing to one or more components of the interactive environment by operation of one or more computer processors, an indication to perform a respective predefined operation, wherein the predefined operations are related to the first group activity and modify the interactive environment to enhance the first group activity.

2. The method of claim 1, wherein the first group activity template specifies a weight for the first action used to compute the score for the first action, wherein the first group activity template specifies a respective weight for the first action and each subsequent action used to compute the composite score.

3. The method of claim 1, wherein a first component of the interactive environment comprises a notification component, wherein the respective predefined operation of the notification component comprises notifying one or more users that the first group activity is occurring in the interactive environment.

4. The method of claim 3, wherein a second component of the interactive environment comprises an object generation component, wherein the respective predefined operation of the object generation component comprises generating an object at a first location in the interactive environment to be used by the one or more avatars during the first group activity, wherein the first group activity is occurring at the first location in the interactive environment.

5. The method of claim 4, wherein a third component of the interactive environment comprises a map component, wherein the respective predefined operation of the map component comprises providing a marker at a first location on a map of the interactive environment indicating that the group activity is occurring at the first location in the interactive environment.

6. The method of claim 1, wherein a second action property in the first group activity template comprises a time threshold specifying a maximum amount of time that can elapse after detecting the first action before determining that the first group activity is occurring in the interactive environment.

7. The method of claim 1, wherein each of the plurality of group activity templates are created by one of: (i) user input, and (ii) machine learning used to detect new group activities.

8. The method of claim 1, wherein the actions are monitored by an activity manager of the interactive environment configured to subscribe to an activity feed which communicates all actions occurring in the interactive environment, the method further comprising:
deactivating the first group activity upon determining that one or more termination criteria specified in the first group activity template for ending the first group activity are met.

9. A system, comprising:
one or more computer processors; and
a memory containing a program, which when executed by the one or more computer processors, performs an operation to provide responses to emergent group activities in an interactive environment having a plurality of avatars, the operation comprising:
monitoring actions of one or more avatars in the interactive environment, the one or more avatars being controlled by a respective user;
detecting a first action matching a first action property in a first group activity template for a first group activity, of a plurality of group activity templates, wherein the group activity templates define at least one action property for each respective group activity, wherein at least two avatars in the interactive environment participate in the first group activity;
detecting a subsequent set of actions that match a respective action property specified in the first group activity template;
computing a respective score for: (i) the first action, and (ii) each action in the subsequent set of actions, wherein each score reflects a respective likelihood that the first group activity is occurring;
computing a composite score based on the respective scores computed for the first action and each action of the subsequent set of actions;
determining that the first group activity is occurring based on the composite score exceeding a composite score threshold specified in the first group activity template; and
responsive to determining that the first group activity is occurring, issuing to one or more components of the interactive environment by operation of one or more computer processors, an indication to perform a respective predefined operation, wherein the predefined operations are related to the first group activity and modify the interactive environment to enhance the first group activity.

10. The system of claim 9, wherein the first group activity template specifies a weight for the first action used to compute the score for the first action, wherein the composite score reflects a likelihood that the first group activity is occurring, wherein the first group activity template specifies a respective weight for the first action and each subsequent action used to compute the composite score.

11. The system of claim 9, wherein a first component of the interactive environment comprises a notification component, wherein the respective predefined operation of the notification component comprises notifying one or more users that the first group activity is occurring in the interactive environment.

12. The system of claim 11, wherein a second component of the interactive environment comprises an object generation component, wherein the respective predefined operation of the object generation component comprises generating an object at a first location in the interactive environment to be used by the one or more avatars during the first group activity, wherein the first group activity is occurring at the first location in the interactive environment.

13. The system of claim 12, wherein a third component of the interactive environment comprises a map component, wherein the respective predefined operation of the map component comprises providing a marker at a first location on a map of the interactive environment indicating that the group activity is occurring at the first location in the interactive environment.

14. The system of claim 9, wherein a second action property in the first group activity template comprises a time threshold specifying a maximum amount of time that can elapse after detecting the first action before determining that the first group activity is occurring in the interactive environment.

15. The system of claim 9, wherein each of the plurality of group activity templates are created by one of: (i) user input, and (ii) machine learning used to detect new group activities.

16. The system of claim 9, wherein the actions are monitored by an activity manager of the interactive environment configured to subscribe to an activity feed which communicates all actions occurring in the interactive environment, the operation further comprising:

deactivating the first group activity upon determining that one or more termination criteria specified in the first group activity template for ending the first group activity are met.

17. A computer program product to provide responses to emergent group activities in an interactive environment having a plurality of avatars, the computer program product comprising:

a computer-readable storage medium having computer-readable program code embodied therewith, the computer-readable program code executable by a processor to perform an operation comprising:

monitoring actions of one or more avatars in the interactive environment, the one or more avatars being controlled by a respective user;

detecting a first action matching a first action property in a first group activity template for a first group activity, of a plurality of group activity templates, wherein the group activity templates define at least one action property for each respective group activity, wherein at least two avatars in the interactive environment participate in the first group activity;

detecting a subsequent set of actions that match a respective action property specified in the first group activity template;

computing a respective score for: (i) the first action, and (ii) each action in the subsequent set of actions, wherein each score reflects a respective likelihood that the first group activity is occurring;

computing a composite score based on the respective scores computed for the first action and each action of the subsequent set of actions;

determining that the first group activity is occurring based on the composite score exceeding a composite score threshold specified in the first group activity template; and responsive to determining that the first group activity is occurring, issuing to one or more components of the interactive environment by operation of one or more computer processors, an indication to perform a respective predefined operation, wherein the predefined operations are related to the first group activity and modify the interactive environment to enhance the first group activity.

18. The computer program product of claim 17, wherein the first group activity template specifies a weight for the first action used to compute the score for the first action, wherein the composite score reflects a likelihood that the first group activity is occurring, wherein the first group activity template specifies a respective weight for the first action and each subsequent action used to compute the composite score.

19. The computer program product of claim 17, wherein a first component of the interactive environment comprises a notification component, wherein the respective predefined operation of the notification component comprises notifying one or more users that the first group activity is occurring in the interactive environment.

20. The computer program product of claim 19, wherein a second component of the interactive environment comprises an object generation component, wherein the respective predefined operation of the object generation component comprises generating an object at a first location in the interactive environment to be used by the one or more avatars during the first group activity, wherein the first group activity is occurring at the first location in the interactive environment.

21. The computer program product of claim 17, wherein a third component of the interactive environment comprises a map component, wherein the respective predefined operation of the map component comprises providing a marker at a first location on a map of the interactive environment indicating that the group activity is occurring at the first location in the interactive environment.

22. The computer program product of claim 17, wherein a second action property in the first group activity template comprises a time threshold specifying a maximum amount of time that can elapse after detecting the first action before determining that the first group activity is occurring in the interactive environment.

23. The computer program product of claim 17, wherein each of the plurality of group activity templates are created by one of: (i) user input, and (ii) machine learning used to detect new group activities.

24. The computer program product of claim 17, wherein the actions are monitored by an activity manager of the interactive environment configured to subscribe to an activity feed which communicates all actions occurring in the interactive environment, the operation further comprising:

deactivating the first group activity upon determining that one or more termination criteria specified in the first group activity template for ending the first group activity are met.

* * * * *

UNITED STATES PATENT AND TRADEMARK OFFICE
CERTIFICATE OF CORRECTION

PATENT NO. : 9,766,773 B2  Page 1 of 1
APPLICATION NO. : 13/956089
DATED : September 19, 2017
INVENTOR(S) : John Crocker et al.

It is certified that error appears in the above-identified patent and that said Letters Patent is hereby corrected as shown below:

In the Specification

In Column 5, Line 52, after "controller" insert -- . --.

In the Claims

In Column 13, Line 6, in Claim 2, after "action," insert -- wherein the composite score reflects a likelihood that the first group activity is occurring, --.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*